United States Patent
Li et al.

(10) Patent No.: US 9,528,422 B2
(45) Date of Patent: Dec. 27, 2016

(54) PARTICULATE FILTER WASHCOAT DIAGNOSIS BASED ON EXOTHERMIC SUBSTRATE TEMPERATURE

(71) Applicant: GM Global Technology Operations LLC, Detroit, MI (US)

(72) Inventors: Jianwen Li, West Bloomfield, MI (US); Vincent J. Tylutki, Livonia, MI (US); Rahul Mital, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 619 days.

(21) Appl. No.: 13/960,014

(22) Filed: Aug. 6, 2013

(65) Prior Publication Data

US 2015/0043611 A1 Feb. 12, 2015

(51) Int. Cl.
*G01N 25/00* (2006.01)
*G01K 1/00* (2006.01)
(Continued)

(52) U.S. Cl.
CPC .............. *F01N 11/002* (2013.01); *G01K 3/04* (2013.01); *G01K 7/427* (2013.01);
(Continued)

(58) Field of Classification Search
CPC ............ F01N 2510/0682; F01N 11/002; F01N 2250/12; F01N 2550/02; F01N 9/002; F01N 3/035; G01K 3/02; G01K 3/04; G01K 1/00; G01K 13/02; G01N 25/00
(Continued)

(56) References Cited

U.S. PATENT DOCUMENTS 6,167,696 B1 * 1/2001 Maaseidvaag ........ F01N 3/0814
60/274
6,666,020 B2 * 12/2003 Tonetti .................. F02D 41/027
123/299
(Continued)

FOREIGN PATENT DOCUMENTS

DE 19963932 A1 7/2001
DE 102005042843 A1 11/2006
(Continued)

OTHER PUBLICATIONS

German Office Action for DE Application No. 10 2014 110 944.9, dated Oct. 30, 2015, pp. 1-8.

*Primary Examiner* — Gail Kaplan Verbitsky
(74) *Attorney, Agent, or Firm* — Cantor Colburn LLP

(57) ABSTRACT

An exhaust gas treatment system to treat exhaust gas includes a particulate filter, a second temperature sensor and a control module. The particulate filter includes a PF substrate configured to trap particulate matter contained in the exhaust gas. The second temperature sensor is configured to output an outlet temperature signal indicating an outlet temperature at the outlet of the particulate filter. The control module is in electrical communication with the second temperature sensor to receive the outlet temperature signal. The control module determines a maximum substrate temperature of the PF substrate based on the outlet temperature. The control module is further configured to determine whether the particulate filter includes an active washcoat disposed thereon based on the maximum substrate temperature.

4 Claims, 2 Drawing Sheets

(51) Int. Cl.
*G01K 3/02* (2006.01)
*G01K 3/04* (2006.01)
*G01K 13/02* (2006.01)
*F01N 3/035* (2006.01)
*F01N 11/00* (2006.01)
*G01K 7/42* (2006.01)

(52) U.S. Cl.
CPC ...... *F01N 2550/02* (2013.01); *F01N 2560/06* (2013.01); *F01N 2560/14* (2013.01); *F01N 2900/0418* (2013.01); *G01K 2013/024* (2013.01); *G01K 2205/04* (2013.01); *Y02T 10/47* (2013.01)

(58) Field of Classification Search
USPC .... 374/29, 4, 5, 57, 45, 141, 143, 144, 103, 374/102, 104, 112
See application file for complete search history.

(56) References Cited

U.S. PATENT DOCUMENTS

| | | | | |
|---|---|---|---|---|
| 6,779,339 | B1* | 8/2004 | Laroo | F01N 3/0253 60/274 |
| 7,013,638 | B2* | 3/2006 | Hiranuma | F02D 41/029 60/274 |
| 7,082,754 | B2* | 8/2006 | Otake | F01N 3/023 60/274 |
| 7,987,662 | B2* | 8/2011 | Ruona | F01N 3/029 60/274 |
| 8,800,268 | B2* | 8/2014 | Voss | B01D 53/9413 60/274 |
| 9,255,537 | B2* | 2/2016 | Kim | F02D 41/1446 |
| 2005/0129588 | A1* | 6/2005 | Nunan | B01D 53/945 422/177 |
| 2006/0070373 | A1* | 4/2006 | Huang | F01N 3/023 60/286 |
| 2006/0283173 | A1* | 12/2006 | Zheng | F01N 13/0097 60/274 |
| 2008/0083212 | A1* | 4/2008 | Ament | F01N 3/035 60/295 |
| 2008/0201054 | A1* | 8/2008 | Grichnik | B60W 40/00 701/102 |
| 2011/0061371 | A1* | 3/2011 | Cavataio | F01N 3/035 60/286 |
| 2011/0072790 | A1* | 3/2011 | Schmieg | F01N 3/106 60/277 |
| 2012/0226429 | A1* | 9/2012 | Demory | F02D 11/105 701/104 |
| 2012/0255283 | A1* | 10/2012 | Oger | B01D 53/945 60/274 |
| 2012/0297750 | A1* | 11/2012 | Sun | F01N 3/023 60/274 |
| 2013/0025266 | A1* | 1/2013 | Li | F01N 3/103 60/287 |
| 2013/0028818 | A1* | 1/2013 | Eckhoff | F01N 3/0814 423/212 |
| 2013/0152551 | A1* | 6/2013 | Kotnish | F02D 41/1446 60/274 |
| 2013/0333351 | A1* | 12/2013 | Vyas | F02D 41/0245 60/274 |
| 2014/0096685 | A1* | 4/2014 | Backhaus-Ricoult | F01N 3/2882 96/420 |
| 2014/0150413 | A1* | 6/2014 | Backhaus-Ricoult | F01N 5/025 60/299 |
| 2015/0128567 | A1* | 5/2015 | Kondo | F01N 3/2033 60/274 |
| 2015/0252706 | A1* | 9/2015 | Kosters | F01N 3/2066 60/297 |
| 2016/0074855 | A1* | 3/2016 | Qi | B01J 37/0228 502/304 |
| 2016/0201533 | A1* | 7/2016 | Upadhyay | F01N 3/0232 701/102 |
| 2016/0201534 | A1* | 7/2016 | Lambert | F01N 3/035 60/274 |

FOREIGN PATENT DOCUMENTS

DE 102010022317 A1 1/2011
JP 2005061379 A 3/2005

* cited by examiner

PARTICULATE FILTER WASHCOAT DIAGNOSIS BASED ON EXOTHERMIC SUBSTRATE TEMPERATURE

FIELD OF THE INVENTION

The present disclosure relates to exhaust treatment systems, and more particularly to, detecting the presence of an active washcoat on a particulate filter.

BACKGROUND

Engines emit exhaust gas that includes carbon monoxide (CO), hydrocarbons (HC), and nitrogen oxides ($NO_x$). An exhaust treatment system reduces the levels of CO, HC, and NO in the exhaust gas. The exhaust treatment system may include an oxidation catalyst (OC) (e.g., a diesel OC), a particulate filter (PF) (e.g., a diesel PF), and a selective catalytic reduction (SCR) system. The OC oxidizes CO and HC to form carbon dioxide and water. The PF includes a PF substrate that traps particulate matter from the exhaust gas. The SCR system typically includes an SCR device that reduces $NO_x$.

Catalyst washcoats have been traditionally used with SCR devices. The washcoat chemically interacts with the ammonia ($NH_3$) introduced to the exhaust gas, and reduces the level of $NO_x$. Recently, catalyzed washcoats have also been applied to the PF substrate included in the PF.

SUMMARY

In an exemplary embodiment of the disclosure, an exhaust gas treatment system to treat exhaust gas includes a particulate filter, a second temperature sensor, and a control module. The particulate filter includes a PF substrate configured to trap particulate matter contained in the exhaust gas. The second temperature sensor is configured to output an outlet temperature signal indicating an outlet temperature at the outlet of the particulate filter. The control module is in electrical communication with the second temperature sensor to receive the outlet temperature signal. The control module determines a maximum substrate temperature of the PF substrate based on the outlet temperature. The control module is further configured to determine whether the particulate filter includes a washcoat formed thereon based on the maximum substrate temperature.

In another exemplary embodiment of the disclosure, a hardware control module is configured to detect a washcoat on a PF substrate of a particulate filter. The control module includes a substrate temperature module and a washcoat detection module. The substrate temperature module is configured to determine a maximum substrate temperature of the PF substrate. The washcoat detection module is configured to detect the washcoat based on a comparison between the a maximum substrate temperature and a temperature threshold value In yet another exemplary embodiment of the disclosure, a method of detecting a washcoat on a PF substrate of a particulate filter comprises measuring an outlet temperature at an outlet of the particulate filter, and determining a maximum substrate temperature of the PF substrate based on the outlet temperature. The method further includes determining whether the particulate filter includes a washcoat formed thereon based on the maximum substrate temperature.

The above features of the exemplary embodiments are readily apparent from the following detailed description of the present disclosure when taken in connection with the accompanying drawings.

BRIEF DESCRIPTION OF THE DRAWINGS

Other features and details appear, by way of example only, in the following detailed description of embodiments, the detailed description referring to the drawings in which.

DESCRIPTION OF THE EMBODIMENTS

Figure 1:
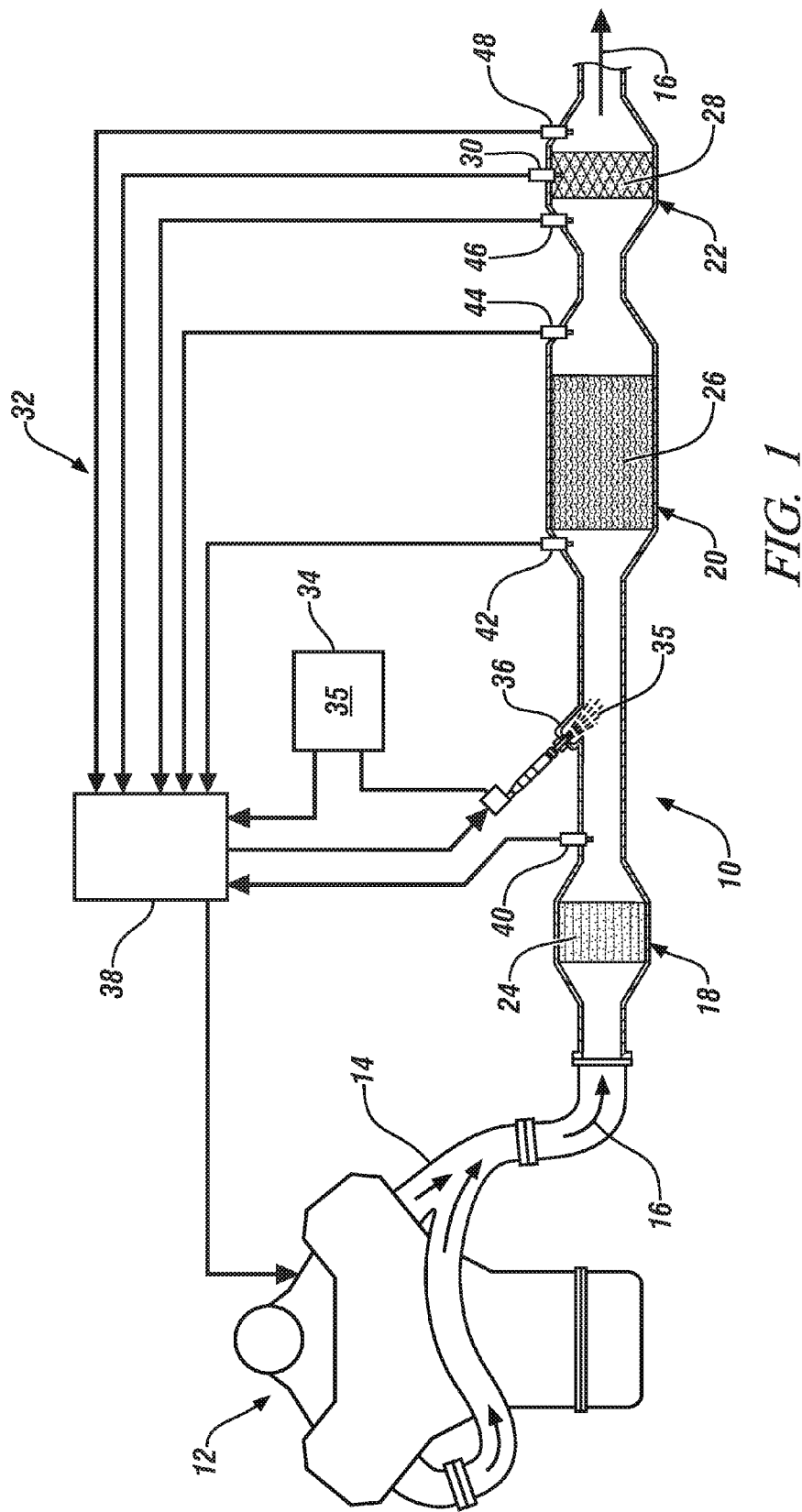
FIG. 1 is a schematic diagram of an exhaust gas treatment system including a control module configured to detect a catalyzed particulate filter according to an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the disclosure, a particulate filter (PF), for example a diesel PF (DPF), is included in a vehicle exhaust treatment system to reduce the amount of particulate matter released from the vehicle. More specifically, exhaust gas entering the PF is forced to migrate through porous, adjacently extending walls of a PF substrate of the PF. The PF substrate captures carbon and other particulate matter from the exhaust gas. Accordingly, the exhaust gas is filtered prior to being exhausted from the vehicle tailpipe.

To enhance the performance of the PF, a catalytic material (hereinafter referred to as a PF washcoat) may be applied to the PF substrate of the PF. The PF washcoat promotes oxidation of soot and particulate matter trapped in the PF substrate under selected conditions, which enhances exothermic reactions occurring at the PF substrate. Accordingly, a PF substrate including a PF washcoat (hereinafter referred to as a catalyzed PF) emits increased temperatures as compared to a PF substrate that excludes the PF washcoat (hereinafter referred to as an uncatalyzed PF). Therefore, the presence of a PF washcoat on a PF substrate may be determined based on a differential between the temperature at the inlet of the PF and the maximum temperature of the PF substrate during the oxidation of the soot/particulate matter trapped in the PF substrate.

Referring now to FIG. 1, an exemplary embodiment is directed to an exhaust gas treatment system 10 for reducing exhaust gas constituents of an internal combustion (IC) engine 12. The exhaust gas treatment system 10 described herein can be implemented in various engine systems. Such engine systems may include, for example, but are not limited to diesel engine systems, gasoline direct injection systems, and homogeneous charge compression ignition engine systems.

The exhaust gas treatment system 10 generally includes one or more exhaust gas conduits 14, and one or more exhaust treatment devices. The exhaust treatment devices include, but are not limited to, an oxidation catalyst device ("OC") 18, and a selective catalytic reduction ("SCR")

device 20, and a particulate filter ("PF") 22. In at least one exemplary embodiment of the disclosure, the PF 22 is a diesel particulate filter. As can be appreciated, the exhaust gas treatment system 10 of the present disclosure may include various combinations of one or more of the exhaust treatment devices shown in FIG. 1, and/or other exhaust treatment devices (not shown) and is not limited to the present example.

In FIG. 1, the exhaust gas conduit 14, which may comprise several segments, transports exhaust gas 16 from the engine 12 to the various exhaust treatment devices 18, 20, 22 of the exhaust gas treatment system 10. As can be appreciated, the OC 18 can be of various flow-through, oxidation catalyst devices known in the art. In various embodiments the OC 18 may include a flow-through metal or ceramic monolith OC substrate 24 that is wrapped in an intumescent mat or other suitable support that expands when heated, securing and insulating the substrate. The OC substrate 24 may be packaged in a stainless steel shell or canister having an inlet and an outlet in fluid communication with the exhaust gas conduit 14. The OC substrate 24 can include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water.

The SCR device 20 may be disposed downstream of the OC 18, and is configured to reduce $NO_x$ constituents in the exhaust gas 16. As can be appreciated, the SCR device 20 can be constructed of various materials known in the art. In various embodiments, for example, the SCR device 20 may be constructed using a wall-flow or flow-through monolith SCR substrate 26, such as, for example, wound or packed fiber filters, open cell foams, sintered metal fibers, etc. In various embodiments, the SCR device 20 includes an SCR catalyst composition (e.g., a SCR washcoat) applied to the substrate 26. The SCR device 20 may utilize a reductant, such as ammonia ($NH_3$) to reduce the $NO_x$. More specifically, the SCR device 20 catalyst composition can contain a zeolite and one or more base metal components such as iron (Fe), cobalt (Co), copper (Cu) or vanadium which can operate efficiently to convert $NO_x$ constituents in the exhaust gas 16 in the presence of $NH_3$. The reductant utilized by the SCR device 20 may be in the form of a gas, a liquid, or an aqueous urea solution and may be mixed with air to aid in the dispersion of an injected spray generated by a reductant supply system, as discussed in greater detail below.

The PF 22 may be disposed downstream from the SCR device 20, and filters the exhaust gas 16 of carbon and other particulate matter (e.g. soot). The PF 22 has an inlet and an outlet in fluid communication with exhaust gas conduit 14 to convey the exhaust gas 16 therethrough. According to at least one exemplary embodiment, the PF 22 may be constructed using a ceramic wall flow monolith exhaust gas PF substrate 28 that is wrapped in an intumescent or non-intumescent material (not shown) that may expand when heated to secure and insulate the PF substrate 28 which is packaged in a rigid, heat resistant shell or canister. It is appreciated that the ceramic wall flow monolith PF substrate 28 is merely exemplary in nature and that the PF 22 may include other filter devices such as wound or packed fiber filters, open cell foams, sintered metal fibers, etc. The exhaust treatment system 10 may perform a regeneration process that regenerates the PF 22 by burning off the particulate matter trapped in the PF substrate 28, as known to those ordinarily skilled in the art.

To enhance the performance of the PF 22, a catalytic material (hereinafter referred to as a PF washcoat) may be applied to the PF substrate 28. The PF washcoat promotes oxidation of hydrocarbons, carbon monoxide (CO), soot and particulate matter trapped in the PF substrate 28 under selected conditions, which enhances exothermic reactions occurring at the PF substrate 28. Accordingly, a catalyzed PF 22 emits increased temperatures as compared to an uncatalyzed PF 22.

The exhaust gas treatment system 10 may further include at least one pressure sensor 30 (e.g., a delta pressure sensor), as illustrated in FIG. 1. The delta pressure sensor 30 may determine a pressure differential (i.e., $\Delta p$) across the PF 22. Although a single delta pressure sensor 30 is illustrated, it is appreciated that a plurality of pressure sensors may be used to determine $\Delta p$. For example, a first pressure sensor may be disposed at the inlet of the PF 22 and a second pressure sensor may be disposed at the outlet of the PF 22. Accordingly, the difference between the pressure detected by the second delta pressure sensor and the pressure detected by the first delta pressure sensor may indicate the $\Delta p$ of the PF 22.

The exhaust treatment system 10 illustrated in FIG. 1 further includes a reductant supply system 32 that introduces a reductant to the exhaust gas 16. The reductant supply system 32 includes a reductant supply source 34, an injector 36, and a control module 38. The reductant supply source 34 stores a reductant 35 and is in fluid communication with the injector 36. The reductant 35 may include, but is not limited to, $NH_3$, and urea. Accordingly, the injector 36 may inject a selectable amount of reductant 35 into the exhaust gas conduit 14 such that the reductant 35 is introduced to the exhaust gas 16 at a location upstream of the SCR device 20.

The control module 38 may control the engine 12, the reductant supply system 32 and the regeneration process based on sensed data provided by one or more sensors and/or modeled data stored in memory. In various embodiments, the control module 38 further diagnoses one or more subsystems and/or devices of the exhaust treatment system based on one or more sensed and/or modeled inputs based on the diagnostic methods and systems of the present disclosure.

Generally speaking, the control module 38 receives one or more temperature signals from a temperature sensor, and controls operation of the injector 36 according to a reductant storage model. The temperature sensors and/or the temperature models may indicate a determined temperature of a respective component and/or thermal area. For example the temperature sensors and/or a temperature model may output a temperature signal indicating a temperature of the SCR device 20 (i.e., the SCR temperature).

In at least one example, the control module 38 is in electrical communication with a plurality of temperatures sensors 40-48. More specifically, a first temperature sensor 40 is disposed at the outlet of the OC 18, a second temperature sensor 42 is disposed upstream from the SCR device 20, and a third temperature sensor 44 is disposed downstream from the SCR device 20. The first temperature sensor 40 senses a temperature of the exhaust gas 16 at the outlet of the OC 18, and generates a first temperature signal based thereon. The second temperature sensor 42 senses a temperature of exhaust gas 16 at the inlet of the SCR device 20 and generates a second temperature signal based thereon. The third temperature sensor 44 senses a temperature of exhaust gas 16 at the outlet of the SCR device 20 and generates a third temperature signal based thereon. In addition, a fourth temperature sensor 46 is disposed at an inlet of the PF 22 and a fifth temperature sensor 48 is disposed at an outlet of the PF 22. The fourth temperature sensor 46 and the fifth temperature sensor 48 generate inlet and outlet temperature signals, respectively, which indicate an actual temperature of the PF 22 and/or a temperature change of the PF 22. Although the exemplary embodiment illustrated in FIG. 1 describes five temperature sensors, it is appreciated that less or more sensors may be included. In addition, the invention is not limited to the location of the sensor described above.

As discussed above, a catalyzed PF 22 emits an increased temperature in response to oxidizing of soot and particulate matter compared to an uncatalyzed PF. Therefore, the control module 38 may determine whether the PF 22 includes an active washcoat disposed on the PF substrate 28 based on a differential between the temperature at the inlet ($T_{IN}$) of the PF 22 and the maximum temperature of the PF substrate 28 ($Ts_{max}$). The determination may be performed during the oxidation of the soot/particulate matter trapped in the PF 22. In at least one embodiment, the control module 38 determines $Ts_{max}$ when one or more entry conditions are satisfied. The entry condition may be based on one or more operating conditions of the vehicle including, but not limited to, temperature of the PF substrate 28, temperature of the exhaust gas 16, and operating time of the engine 12. The $Ts_{max}$ may be calculated as follows:

$$Ts_{max} = \frac{T2 - T0\frac{F\alpha}{mCp} + \frac{McCpb}{mCp}\frac{dT2}{dt}}{1 - \frac{F\alpha}{mCp}},$$

where
$Ts_{max}$ is the maximum temperature of the PF substrate;
T2 is the temperature at the outlet of the PF;
T0 is the ambient temperature surrounding the PF;
F is the heat transfer area of the PF substrate;
$\alpha$ is the heat transfer coefficient
$M_C$ is the mass of substrate;
m is the exhaust mass flow rate
Cp is the specific heat of exhaust gas
Cpb is the specific heat of the PF substrate The "T2" may be provided by the fifth temperature sensor 48. The "T0" may be provided by an ambient temperature sensor disposed on the vehicle as known by those ordinarily skilled in the art. The "m" may be provided by an exhaust gas flow sensor that measures exhaust flow rate as known by those ordinarily skilled in the art. The "F", "$\alpha$", "$M_C$", "Cp", and "Cpb" are constants stored in a memory device. In at least one embodiment, the control module 38 calculates $TS_{max}$.

The control module 38 calculates an exothermal temperature differential ($\Delta Ts$) between $Ts_{max}$ and $T_{IN}$ (i.e., $\Delta Ts = Ts_{max} - T_{IN}$), and compares $\Delta Ts$ to a threshold value ($T_{TH}$) stored in the memory device. If $\Delta Ts$ exceeds $T_{TH}$, then the control module 38 determines that the PF substrate 28 includes an active washcoat (i.e. the PF substrate 28 is catalyzed). Otherwise, the control module 38 determines the PF substrate 28 is an inactive washcoat (i.e., the PF substrate 28 is uncatalyzed) and/or the washcoat has failed.

In at least one embodiment of the present disclosure, the control module 38 may integrate $Ts_{max}$ over a selected time period (t) to calculate an integrated $Ts_{max}$ ($\int Ts_{max}$). The time period may range between a first time event ($t_0$) and a second time event ($t_N$) different from $t_0$. When the time period expires, the control module 38 may calculate the exothermal temperature differential ($\Delta Ts$) between $\int Ts_{max}$ and $T_{IN}$ (i.e., $\Delta Ts = \int Ts_{max} - T_{IN}$), and determine whether the PF substrate 28 includes a washcoat as discussed in detail above. Accordingly, by calculating the $\Delta Ts$ based on $\int Ts_{max}$, a more accurate detection of the washcoat and/or whether a washcoat is failed may be performed.

Figure 2:
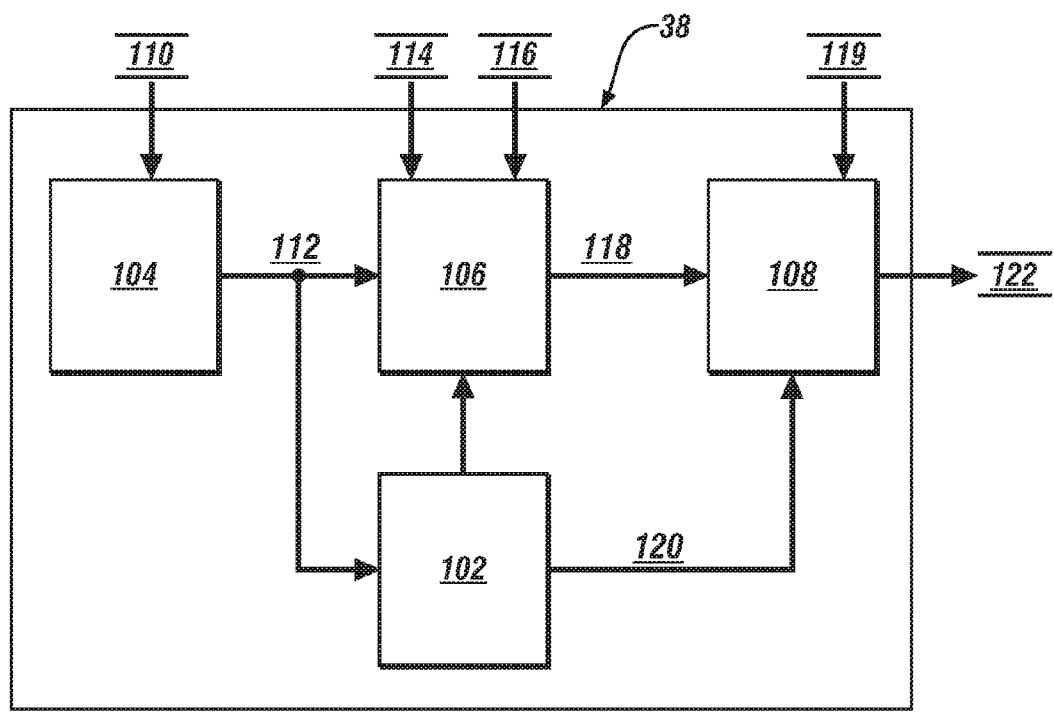
FIG. 2 is a block diagram of a control module configured to detect a catalyzed particulate filter according to an exemplary embodiment.

Turning now to FIG. 2, a block diagram illustrates a control module 38 that determines the presence of an active PF washcoat on the PF substrate 28. Various embodiments of the exhaust gas treatment system 10 may include any number of sub-modules embedded within the control module 38. As can be appreciated, the sub-modules shown in FIG. 2 may be combined or further partitioned as well. Inputs to the control module 38 may be sensed from the exhaust gas treatment system 10, received from other control modules, for example an engine control module (not shown), or determined by other sub-modules.

As illustrated in FIG. 2, the control module 38 according to at least one embodiment includes a memory 102, an entry condition module 104, a substrate temperature module 106, and a washcoat detection module 108. Each of the modules 104-108 interfaces and electrically communicates with the memory 102 to retrieve and update stored values as needed.

The memory 102 may store one or more threshold values, time periods over which the temperatures were measured a number of configurable limits, maps, data values, variables, and system models used to control the reductant supply system 32. In at least one embodiment of the present disclosure, the memory 102 stores PF substrate parameters including, but not limited to, F, $\alpha$, m, Cp, and Cpb.

The entry condition module 104 may determine if one or more entry conditions exist based on one or more operating condition signals 110. The operating condition signals 110 may be output by one or more sensors of the vehicle. For example, the entry condition module 104 may compare operating conditions provided by various sensors, to one or more threshold values stored in the memory 102. Based on the comparison, the entry condition module 104 determines that the entry conditions are satisfied, and generates an entry condition signal 112 initiating the diagnostic to detect whether the PF substrate 28 includes an active washcoat and/or whether the washcoat is failed due to degradation caused by thermal exposure.

The substrate temperature module 106 determines the $Ts_{max}$ based on the PF substrate parameters, the exhaust flow rate (m), and the outlet temperature (T2) of the PF 22. The exhaust flow rate (m) may be obtained from a flow rate signal 114 output by an exhaust flow rate sensor, and T2 may be obtained from an outlet temperature signal 116 output by the fifth temperature sensor 48. In at least one embodiment, the substrate temperature module 106 may calculate an integrated $Ts_{max}$ (i.e., $\int Ts_{max}$), which is integrated over a selected time period (t). The selected time period may be stored in the memory 102. In at least one embodiment, the substrate temperature module 106 determines $Ts_{max}$ in response to receiving the entry condition signal 112.

The washcoat detection module 108 detects the existence of an active washcoat based on a temperature differential corresponding to the PF 22 and a temperature threshold ($Ts_{TH}$) 120 stored in the memory 102. The washcoat detection module 108 may also determine whether a washcoat is failed due to degradation caused by thermal exposure. According to an exemplary embodiment, the washcoat detection module 108 may receive a $Ts_{max}$ signal 118 indicating $Ts_{max}$ and an inlet temperature signal 119 indicating the inlet temperature ($T_{IN}$) of the PF 22. As discussed above, the $Ts_{max}$ signal 118 may be indicate a single maximum substrate temperature at a particular instance of time (i.e., $Ts_{max}$), or may include a maximum substrate temperature integrated over a selected time period (i.e., $\int Ts_{max}$). A PF temperature differential ($\Delta T_{PF}$) may be determined, for example, by subtracting $T_{IN}$ from $Ts_{max}$ (i.e., $\Delta T_{PF}=Ts_{max}-T_{IN}$).

An activity of the washcoat may be determined according to a comparison between $\Delta T_{PF}$ and $Ts_{TH}$. For example, if $\Delta T_{PF}$ exceeds $Ts_{TH}$, then the washcoat detection module 108 determines an active washcoat is disposed on the PF substrate 28 and outputs a diagnostic signal 122 indicating the washcoat exists or is operable. If, however, $\Delta T_{PF}$ does not exceed $Ts_{TH}$, then the washcoat detection module 108 determines the PF substrate 28 includes an inoperable (i.e., failed washcoat) and/or no washcoat, and outputs a diagnostic signal 122 indicating such.

Figure 3:
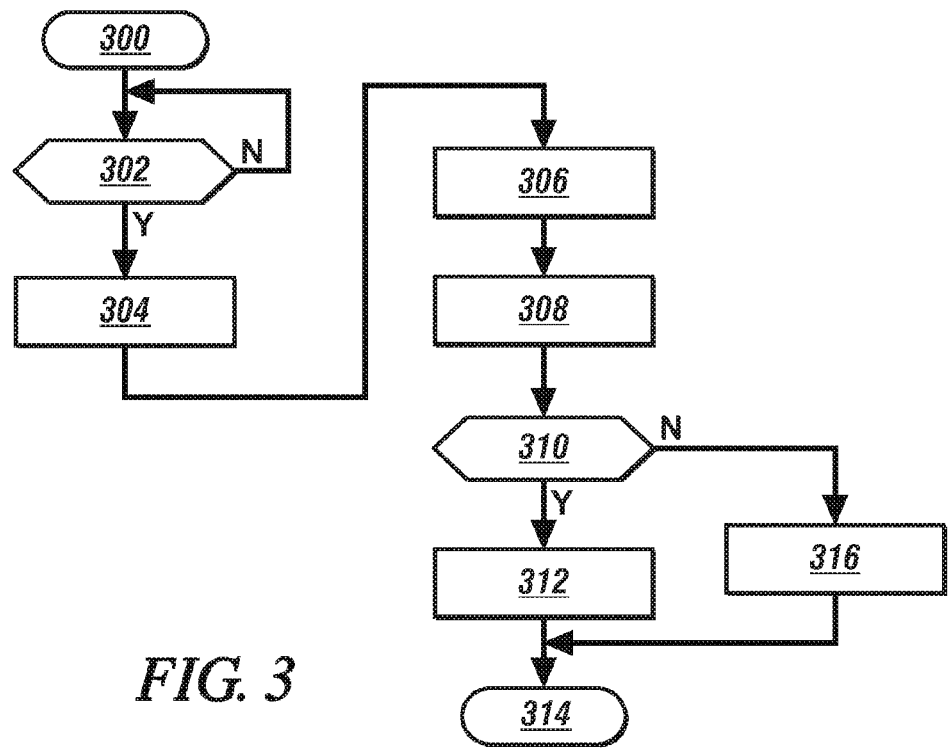
FIG. 3 is a flow diagram illustrating a method of detecting a washcoat on PF substrate of a particulate filter according to an exemplary embodiment.

Turning now to FIG. 3, a flow diagram illustrates a method of detecting an active washcoat on a PF substrate according to the present disclosure. The method begins at operation 300, and proceeds to operation 302 to determine whether one or more entry conditions exist. If the entry conditions do not exist, the method returns to operation 302 and continues monitoring for the existence of entry conditions. Otherwise, the method determines a temperature of the PF substrate at operation 304. In at least one exemplary embodiment of the present disclosure, the temperature of the PF substrate includes a maximum PF substrate temperature ($Ts_{max}$) as discussed above, for example. At operation 306, $Ts_{max}$ is integrated over a time period (t) to determine an integrated temperature value (e.g., $\int Ts_{max}$), for example. At operation 308, a temperature differential ($\Delta T_{PF}$) of the PF is determined. For example, $\Delta T_{PF}$ may be based on the inlet temperature ($T_{IN}$) of the PF and $\int Ts_{max}$. At operation 310, $\Delta T_{PF}$ is compared to a threshold (e.g., $Ts_{TH}$). The threshold may include, for example, a single threshold value or a threshold range defined by an upper threshold value and a lower threshold value. If, for example, $\Delta T_{PF}$ exceeds $Ts_{TH}$, then a washcoat disposed on the PF substrate is active at operation 312 and the method ends at operation 314. Otherwise, the PF substrate is determined to have an inoperable (i.e. failed) and/or no washcoat at operation 316 and the method ends at 314.

Based on at least one exemplary embodiment described above, difficulties in detecting the operation and/or existence of a washcoat caused by heat losses from the PF substrate may be resolved, thereby improving separation (i.e., identification) between a functioning catalyzed PF and a non-functioning uncatalyzed PF. Accordingly, a more robust and accurate PF washcoat diagnostic is achieved.

As used herein, the term module refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality. In at least one embodiment of the present disclosure, a module may include a microcontroller as understood by those ordinarily skilled in the art.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system to treat exhaust gas, comprising:
    a particulate filter including a filter substrate configured to trap particulate matter contained in the exhaust gas;
    a first temperature sensor configured to output an outlet temperature signal indicating an outlet temperature at the outlet of the particulate filter, and a second temperature sensor configured to output an inlet temperature signal indicating an inlet temperature at an inlet of the particulate filter; and
    a control module in electrical communication with the temperature sensor to receive the outlet temperature signal, to determine a maximum substrate temperature of the filter substrate based on the outlet temperature, and to determine whether the particulate filter includes an active washcoat disposed thereon based on the maximum substrate temperature, the maximum substrate temperature being a maximum temperature of the filter substrate integrated over a time period ranging between a first time event and a second time event different from the first time event,
    wherein the control module calculates a temperature differential between the inlet temperature and the maximum substrate temperature, and detects the active washcoat in response to the temperature differential exceeding a temperature threshold value.

2. The exhaust gas treatment system of claim 1, wherein the maximum substrate temperature is electrically calculated by the control module according to the algorithm of:

$$Ts_{max} = \frac{T2 - T0\frac{F\alpha}{mCp} + \frac{McCpb}{mCp}\frac{dT2}{dt}}{1 - \frac{F\alpha}{mCp}},$$

wherein $Ts_{max}$ is the maximum temperature of the PF substrate;
T2 is the temperature at the outlet of the PF;
T0 is the ambient temperature surrounding the PF;
F is the heat transfer area of the PF substrate;
α is the heat transfer coefficient;
$M_C$ is the mass of substrate;
m is the exhaust mass flow rate;
Cp is the specific heat of exhaust gas; and
Cpb is the specific heat of the PF substrate.

3. A method of detecting a washcoat activity on a filter substrate of a particulate filter, the method comprising:
    determining an inlet temperature at an inlet of the particulate filter, and determining an outlet temperature at an outlet of the particulate filter;
    determining a maximum substrate temperature of the filter substrate based on the outlet temperature;
    detecting an active washcoat activity on the filter substrate based on the maximum substrate temperature, wherein the maximum substrate temperature is a maximum temperature of the filter substrate integrated over a time period ranging between a first time event and a second time event different from the first time event; and
    determining a temperature differential between the inlet temperature and the maximum substrate temperature, and detecting an active washcoat of the filter substrate in response to the temperature differential exceeding a threshold temperature value.

4. The method of claim 3, further comprising determining the maximum substrate temperature according to the algorithm of:

$$Ts_{max} = \frac{T2 - T0\frac{F\alpha}{mCp} + \frac{McCpb}{mCp}\frac{dT2}{dt}}{1 - \frac{F\alpha}{mCp}}$$

wherein $Ts_{max}$ is the maximum temperature of the PF substrate;
T2 is the temperature at the outlet of the PF;
T0 is the ambient temperature surrounding the PF;
F is the heat transfer area of the PF substrate;
$\alpha$ is the heat transfer coefficient;
$M_C$ is the mass of substrate;
m is the exhaust mass flow rate;
Cp is the specific heat of exhaust gas; and
Cpb is the specific heat of the PF substrate.

* * * * *